Sept. 25, 1928.
L. R. HURLBURT
1,685,423
METHOD OF MAKING TENNIS BALLS
Filed Nov. 8, 1927
Fig. I.
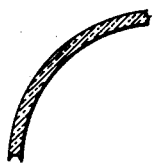
Fig. II.
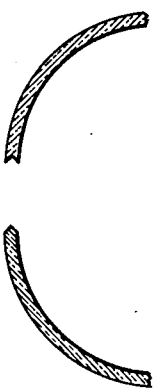
Fig. III.
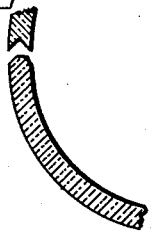
INVENTOR
Lee R. Hurlburt
by Christy and Christy
his attorneys Patented Sept. 25, 1928.

1,685,423

UNITED STATES PATENT OFFICE.

LEE R. HURLBURT, OF JEANNETTE, PENNSYLVANIA, ASSIGNOR TO PENNSYLVANIA RUBBER COMPANY, OF JEANNETTE, PENNSYLVANIA, A CORPORATION OF PENNSYLVANIA.

METHOD OF MAKING TENNIS BALLS.

Application filed November 8, 1927. Serial No. 231,957.

My invention relates to the manufacture of hollow rubber spheres, and finds practical application in the manufacture of tennis balls. Such articles are commonly formed as two hemispherical shells, brought together edge to edge and united on an equator. Tennis balls consist essentially of thin-walled spheres of rubber compounded to afford the desired resilience to the ball when inflated. They are very minutely standardized in size and in weight, as well as in resilience. In their manufacture the hemispherical shells are molded and semi-cured; the semi-cured shells are brought together edge to edge and integration across the seam as well as vulcanization are effected while the body of rubber is under compressive strain. This ordinarily is effected within a snug-fitting mold, and, cooperating with such strain as the mold itself may exert, the body of air or other gas within the ball will under the heat of vulcanization, tend to expand, and so to act compressively upon the rubber. The meeting edges of the hemispheres are ordinarily beveled, with the ends in view of increasing the areas of adhesion and of obtaining a smooth seam—externally, at least. But while the seam may be smooth on the outside, there is apt to be displacement within, and the development along the seam of an inwardly extending fin of rubber. This is undesirable both because it is a waste of rubber and because the result is an unequal distribution of the whole mass of rubber and a consequent failure to attain the perfect symmetry desired.

I have discovered this displacement of rubber and this development of an interior fin to be due to the compressive strains to which I have alluded acting upon the thin and plastic walls. And my invention consists in such a modification in the shape of the meeting edges that displacement is guarded against and prevented. I form the edges of the hemispheres with complementary tongue and groove, and when the hemispheres are united and when in the mold the body of rubber is heated and subjected to compressive strain, not only is there no displacement of edge upon edge, but alignment is accurately maintained, the compressive strains are wholly effective toward the intended end, and the result is a better balanced and more effectively integrated ball.

My invention is illustrated in the accompanying drawings. Fig. I is a fragmentary view in section on a plane perpendicular to the seam showing in adjacent positions the edges of two hemispheres, which will be understood to be hemispheres of soft rubber, about to be united in the making of a tennis ball. Fig. II is a like view, illustrating a modification. Fig. III is a view to larger scale, illustrating a minor modification of the shape of the article as seen in Fig. II.

The hemispheres are molded, after the manner known to the art, and prepared for union one with another in what is called semi-cured or semi-vulcanized condition.

In the practice of my invention I shape the edges, not to the usual square or beveled abutting surfaces, but to companion tongue and groove. Preferably the tongue and groove are shaped on simple and approximately semi-circular curves, as shown in Fig. I. They may be shaped to projecting and reentrant angles, as shown in Fig. II; and in either case the complementary edges may be so particularly shaped as to leave at the bottom of the groove when the edges have been brought together, a narrow space for the accumulation of any surplus of cement. Such provision appears in the truncating of the projecting angle, illustrated in Fig. III.

The meeting edges are cemented together and the cement may be of one sort or another, but in any case it will at the time of application be softer and more fluid than the rubber to the surfaces of which it is applied. Preferably I employ rubber cement,—that is to say rubber dissolved in a relatively volatile solvent. The rubber which is employed may be substantially the rubber mix of which the hemispheres themselves are formed. When the cement has been applied and the hemispheres united, the solvent is dispelled, and a practically homogeneous seam is formed. If the cement be of a softer and permanently more plastic substance than the rubber of the finished ball, then the ball in play will stretch at the seam more than elsewhere; conversely, if the cement be relatively hard, the stretching at the seam will be less. But a union effected of rubber itself gives an ideal condition of seam.

In making assembly the hemispheres may be placed in the two halves of the vulcanizing mold and, the edges being properly prepared, the halves may be brought together on the closing of the mold. Alternatively, the hemispheres properly supported may initially be stuck together, and then introduced into the mold. In one case the seam will lie in the meeting plane of the mold halves; in the other case the position of the seam of the ball within the mold will be accidental and will vary indefinitely.

The tongue-and-groove connection may be minutely shaped as preferred. I have shown in Fig. I the preferred approximately semicircular shape, in Fig. II a V-shape, and in Fig. III, V-shape with truncated apex. Manifestly the showing does not exhaust the known forms of tongue-and-groove joints.

I have spoken of the ball parts as hemispheres and of the seam as being equatorial. This is substantially true. The position of the seam may, however, vary somewhat from an accurately equatorial position.

It is because a tennis ball is thin-walled and formed of relatively soft rubber that the difficulties of manufacture to which I have addressed myself exist. The wall is actually in thickness about one tenth of the radius of the sphere.

I have said nothing about inflation and inflation means. Tennis balls contain air or equivalent gas under pressure somewhat exceeding atmospheric. This excess pressure may be achieved by chemical reaction within the closed chamber of the ball, or by manufacture in a chamber where the desired excess pressure is maintained, or by penetration of the wall of the ball by an inflating needle, with provision that upon withdrawal of the needle, the puncture will automatically close. My invention may be practiced in the manufacture of the ball, by whatever means it may be inflated.

I claim as my invention:

As a step in the manufacture of hollow rubber spheres the method herein described which consists in preforming two hemispherical shells of semi-cured and relatively plastic rubber with edges shaped to complementary tongue and groove, and vulcanizing into an integral sphere of elastic but non-plastic material, the shells while held under pressure to edge-to-edge engagement.

In testimony whereof I have hereunto set my hand.

LEE R. HURLBURT.